United States Patent

[11] 3,616,840

| [72] | Inventor | Adam Dunlop<br>23 Manse View Terrace, Douglas, Lanark, Scotland |
|---|---|---|
| [21] | Appl. No. | 789,918 |
| [22] | Filed | Jan. 8, 1969 |
| [45] | Patented | Nov. 2, 1971<br>Continuation-in-part of application Ser. No. 760,716, Sept. 18, 1968, now abandoned. |

[54] METHOD OF MAKING MULTILAYER SHELL MOLDS
17 Claims, No Drawings

[52] U.S. Cl. .................................................. 164/26,
164/34, 164/41, 106/38.3, 106/38.35, 106/38.9
[51] Int. Cl. ...................................................... B22c 1/16
[50] Field of Search........................................... 164/25, 26,
34, 35, 165, 361, 41; 106/38.3, 38.35, 38.9

[56]  References Cited
UNITED STATES PATENTS

| 2,383,812 | 8/1945 | Navias................. | 164/35 |
| 2,806,270 | 9/1957 | Shaul................... | 164/26 |
| 3,018,528 | 1/1962 | Horton................. | 164/26 |
| 3,209,421 | 10/1965 | Shepherd............. | 164/25 X |
| 3,249,972 | 5/1966 | Watts et al............ | 164/26 |
| 2,811,760 | 11/1957 | Shaw.................... | 164/41 |
| 2,842,444 | 7/1958 | Emblem et al........ | 106/38.3 |

FOREIGN PATENTS

| 913,770 | 12/1962 | Great Britain........ | 164/34 |

Primary Examiner—R. Spencer Annear
Attorney—Edgar N. Jay

ABSTRACT: Shell molds are prepared by applying to a pattern a slurry containing sodium or potassium silicate, removing the pattern from the slurry and coating it with refractory material, and then applying a phosphorus-containing gelling agent. The cycle is then repeated until the desired number of layers are built up on the pattern.

METHOD OF MAKING MULTILAYER SHELL MOLDS

This invention is a continuation-in-part of application Ser. No. 760,716, filed Sept. 18, 1968 now abandoned.

This invention relates to shell molds and, more particularly, to the manufacture of molds for the casting of metals formed by the sequential application of refractory material to a pattern thus building up layers of such refractory material.

BACKGROUND OF THE INVENTION

In the so-called expendable pattern method of forming molds and cores, a pattern or core box is first coated with a primary investment material by immersing in a slurry of e.g., ethyl silicate, cleaning the excess slurry from the pattern and then applying a stucco of dry refractory material, such as sand or quartz silica, and the like. This initial coating is allowed to air dry for 1 to 2 hours after which a second application of slurry and stucco is applied to form a second coat. The air drying operation is again allowed to occur for 1 to 2 hours and then additional coats, generally five to six coats, of refractory material and slurry are applied alternately to the pattern to build up a shell of the desired strength and thickness. After the slurry material and refractory material has hardened to a sufficient strength, the expendable pattern, which is generally wax, is removed by the application of sufficient heat to melt the pattern.

From the foregoing, it will be obvious that a considerable length of time, i.e., one to two days depending upon the number of layers of refractory material applied, is necessary to build up a suitable mold. In addition to the time consumed, the manufacture of such molds occupies a considerable amount of plant area because of the lengthy drying periods necessary in the process and the necessity of storage of the molds while drying between layers. Care must also be taken in the manner in which heat is applied to destroy the expendable pattern. In the case of a pattern of wax, heat must be applied so that there is sufficient melting of the wax at the interface between the green shell and the wax to provide a "cushion" to absorb the expansion of the solid wax body against the walls of the green shell. This dewaxing is referred to as "flash dewaxing" wherein the mold is subjected to a temperature of 2,000° F. to 2,200° F. to rapidly melt the wax with a minimum of expansion. If the wax pattern expands too rapidly without the formation of the "cushion," the mold will be cracked because of its inability to withstand the stresses set up by the expanding wax pattern. For this reason, the use of a plastic pattern, while desirable because of their greater stability and resistance to damage and deformation, are not generally employed for use as expandable patterns because of the high temperatures required for melting the patterns the greater degree of expansion and, thus, the greater possibility for damage to the green shell.

A novel method of the preparation of the investment molds has now been found which is not susceptible to the deficiencies of the prior art.

SUMMARY OF THE INVENTION

The novel process of the present invention relates to the manufacturing of shell molds which includes the steps of: 1) applying to a pattern a slurry containing sodium silicate or potassium silicate; 2) removing said pattern from said slurry; 3) coating the pattern with a suitable refractory powder; 4) applying to the pattern a liquid gelling agent for the silicate a phosphorus-containing compound, such as phosphorus pentoxide or phosphorus trichloride; and 5) removing the pattern from said gelling agent and allowing the silicate to gel. Since the gelling step is accomplished in a matter of seconds, the process can then be repeated almost immediately, thus, building a plurality of layers of refractory material in a relatively short time on a continuous basis. For example, it is possible to form a shell mold in about 2 minutes using a relatively simple apparatus for transferring the pattern through the sequential coating steps.

Because of the use of sodium or potassium silicate in the present invention, the slurries can be stored for a greater length of time than has heretofore been possible with the use of an alkyl silicate such as ethyl silicate. Employing the gelling agent of the present invention, it is also possible to use plastic patterns since a greater degree of strength is achieved in the formation of the green molds which can withstand the stresses and forces of expansion encountered in heating the mold for the purpose of destroying the pattern. Dewaxing can be carried out at a lower temperature than "flash dewaxing" conventionally employed.

The phosphorus-containing compound is employed in a suitable organic carrier such as an alcohol, ketone or hydrocarbon, in a solution, suspension or dispersion. Preferably, a solution is employed, and more preferably, a solution in a lower alcohol, e.g., methyl, ethyl, and isopropyl.

DETAILED DESCRIPTION

In carrying out the process of the present invention, a pattern of wax or plastic is subjected to a series of cycles which includes the steps of applying to the pattern: (1) the silicate-containing slurry, (2) refractory material, and (3) the liquid gelling agent. The aforementioned steps are then repeated.

The slurry is composed of the silicate, i.e., potassium or sodium silicate, and water. In order to provide sufficient viscosity to obtain the deposition of a sufficient amount of slurry onto the pattern, a viscosity increasing material is also included. Preferably, a material such as zircon or molochite flour is added in sufficient quantity to adjust the viscosity to provide the desired deposition of the slurry on the pattern. A preferred viscosity is 7 to 10 seconds (Number 4 Zahn cup). It should be understood, however, that the viscosity of the slurry is not critical and any desired viscosity may be employed at the option of the operator.

Conventional wetting agents and defoaming agents are also preferably employed in the slurry of the present invention. Preferred wetting agents are detergents and the dioctyl ester of sulfosuccinic acid. Suitable defoaming agents include octyl alcohol and silicones.

The following nonlimiting examples illustrate suitable slurries within the scope of the present invention.

EXAMPLE 1

| | |
|---|---|
| Sodium silicate | 1,000 ml. |
| Water | 1,000 ml. |
| Wetting Agent | 5 ml. |
| Octyl alcohol | 5 ml. |
| Sufficient zircon flour to provide a viscosity of 7 to 10 seconds (No. 4 Zahn cup). | |

EXAMPLE 2

| | |
|---|---|
| Potassium silicate | 1,000 ml. |
| Water | 1,000 ml. |
| Wetting agent | 5 ml. |
| Octyl alcohol | 5 ml. |
| Sufficient zircon flour to provide a viscosity of 7 to 10 seconds (No. 4 Zahn cup). | |

EXAMPLE 3

| | |
|---|---|
| Sodium silicate | 1,000 ml. |
| Water | 500 ml. |
| Wetting agent | 5 ml. |
| Octyl alcohol | 5 ml. |
| Sufficient zircon flour to provide a viscosity of 7 to 10 seconds (No. 4 Zahn cup). | |

EXAMPLE 4

| | |
|---|---|
| Soluble sodium silicate powder | 385 grams |
| Water | 200 ml. |
| Wetting agent | 5 ml. |
| Octyl alcohol | 5 ml. |
| Sufficient molochite flour to provide a viscosity in the range of 7 to 10 seconds (No. 4 Zahn cup). | |

Conventional refractory material is employed in the present invention, for example, calcined alumina, fused silica, zircon, molochite, quartz sand and the like. Preferably, fused silica sand is employed especially where thermal shock resistance is desired in the mold. The refractory material is preferably applied to the pattern from a fluidized bed. Although any method of application of refractory material can be employed, the use of a fluidized bed of the refractory material provides the greatest speed and efficiency of application.

After the application of the refractory material, the liquid gelling agent is then applied to the pattern. Preferably, the pattern is dipped into a container of the liquid gelling agent. Alternately, the gelling agent can be sprayed or poured over the pattern.

The phosphorus compound is generally employed at a level of at least 25 grams per liter of the carrier. Up to 500 grams per liter and more can be employed if desired. In a preferred embodiment about 225 grams per liter of phosphorus pentoxide in alcohol is employed.

The following nonlimiting examples illustrate the novel gelling compositions of the present invention.

EXAMPLE 5

| | |
|---|---|
| Isopropyl alcohol | 1,000 ml. |
| Phosphorus pentoxide | 500 grams |

EXAMPLE 6

| | |
|---|---|
| Ethyl alcohol | 1,000 ml. |
| Phosphorus pentoxide | 113 grams |

EXAMPLE 7

| | |
|---|---|
| Ethyl alcohol | 1,000 ml. |
| Phosphorus pentoxide | 226 grams |

EXAMPLE 8

| | |
|---|---|
| Isopropyl alcohol | 100 ml. |
| Phosphorus trichloride | 25 grams |

While the mechanism of the gelling or hardening of the sodium and potassium silicates is not known for certain, it is believed that a combination of reactions are occurring. The phosphorus trichloride and the phosphorus pentoxide are known to be acidic and are believed to act as desiccants while at the same time converting the silicate to silica.

In a particularly preferred embodiment, phosphorus pentoxide is employed since this material provides a greater degree of hardness to the mold than has heretofore been obtainable.

The primary advantages of the present invention include the rapidity of the gelling of the silicate at room temperature. The present invention is particularly advantageous in that in the gelling step, no water is introduced into the system thus providing for a more rapid drying. The gelling agent of the present invention provides especially rapid gelling as described above, thus, shortening considerably the cycle necessary for the preparation of the molds and cores of the present invention. Other advantages described above include the production of molds and cores of greater hardness by virtue of the preferred phosphorus pentoxide and the greater strength in the green shell permitting the employment of plastic patterns which heretofore have not been possible. It has been found that a green shell strength of molds prepared by the present invention is greater than comparable molds gelled by acids or alcohols. For example, an increase in strength of 50 percent and more has been found.

Although the above-described slurries of sodium and potassium silicate may comprise the sole slurry material employed in the formation of the shells, in a preferred embodiment, the primary investment slurry is based on an alkyl silicate. Prior to the application of the initial slurry, the wax pattern should be cleaned, by, for example, soaking in alcohol, brushing to remove any traces of mold lubricant and the like.

In one embodiment, a 20 percent hydrolyzed ethyl silicate slurry containing 6 gallons of the silicate and 230 pounds of zircon flour (viscosity 8 to 12 seconds, a No. 5 Zahn cup) is applied initially to the wax pattern. A 60 to 80 mesh molochite flour is then employed as the first application of stucco. Particular care is taken in the application of the initial coat to insure that no air bubbles are entrapped on the mold surface. After the initial coat, the pattern can then be immersed immediately in a slurry, for example, the slurry of example 3, or preferably, the initial coat may be air dried, prior to continuing with the process of the present invention. Alternatively, an aqueous silica sol can be employed containing, for example 20-30 percent silicon dioxide, e.g., the product sold under the trade name Ludox.

The sodium or potassium silicate slurry, for example, the slurry of example 3, is then used as the slurry for providing the subsequent layers to the shell. Immediately after the removal of the pattern from the secondary slurry, draining, and stuccoing in the fluidized bed employing, e.g., 30 to 60 mesh grade molochite refractory material, the pattern is immediately immersed in, for example, a solution of 1,000 ml. of isopropyl alcohol containing 50 grams of phosphorus pentoxide. The cycle is then repeated by reimmersing the pattern in the secondary slurry, draining, immersing in the gelling solution, and so on, until the desired number of layers have been added to the shell.

The invested pattern assembly is then dewaxed by flash heating in an oven in an oxidizing atmosphere at a temperature in the range, for example, of 1,500° to 1,900° F. The dewaxing may be carried out either immediately after the final application of gelling agent, or optionally, the mold may be stored prior to dewaxing for an indefinite length of time.

The above experiment was repeated using 226 grams of phosphorus pentoxide per 1,000 ml. of isopropyl alcohol as the gelling agent. Significantly greater resistance to deformation, in the green stage, during dewaxing, and the finished mold was found.

Contrary to the prior art, it is preferred to dewax the pattern by heating to a temperature between 1,600° F. and 1,900° F., preferably 1,800° F. An upper limit of 1,900° F. is employed, as opposed to the conventional temperatures of 2,000° F. to 2,200° F. generally employed in the art. While temperatures in excess of 2,000° F. are employed to provide the above-mentioned cushion effect to prevent the distortion of the mold, in the present invention removal of the pattern is carried out at a lower temperature, producing a stronger finished mold from a mold which possesses unusual strength in the green form.

After removing the pattern at the lower temperatures, however, there is no restriction on temperatures used for preheating the molds prior to use. In fact, temperatures higher than conventionally employed are satisfactory due to the greater strength of the mold. Thus, molds prepared by the method of the present invention possess greater resistance to deformation under load.

The length of time that the mold should be heated is only that necessary to remove the wax or plastic and all traces of carbonized material. Removal of such carbonized material is particularly important if the mold is to be used for pouring steel; however, if bronze is to be used small amounts of carbonaceous material remaining is not particularly detrimental. As stated above, the temperature preferably does not exceed 1,900° F.

In a particularly preferred embodiment, the ratio of slurry to stucco in each shell coat is approximately 110 grams of slurry to 74 grams of stucco.

In some instance, it may be desirable to provide for the addition of extra silicate to the shell in addition to that provided by the sodium or potassium silicate slurry. The addition of such extra silicate can be provided by means of the liquid gelling agent. For example, an alkyl silicate such as hydrolyzed ethyl silicate can be incorporated into the liquid gelling agent which would thus provide for the deposition of additional silicate onto the pattern simultaneously with the contacting of the pattern with the liquid gelling agent.

The gelling of the slurry, while already significantly rapid at room temperature may be accelerated still further by elevating the temperature of the air surrounding the pattern after the application of the liquid gelling agent or applying a vacuum to the pattern subsequent to the contact with the liquid gelling agent.

Any suitable device can be employed for providing the sequential contact of the pattern with the various compositions. It is preferred, of course, to employ mechanical equipment since the elapsed time necessary for each step is relatively short, thus, providing for a significantly increased production rate of the molds.

The term "mold" as employed herein, is meant to include both "mold" as used conventionally, meaning a body containing a cavity, and "core," or that portion of a mold which tends to shape the inside of a hollow casting. Thus, the term "pattern" as used herein is intended to include the conventional pattern for use in forming a mold and a core box employed for the formation of the core.

What is claimed:

1. A method of manufacturing multilayer shell molds which comprises the steps of applying to a pattern an alkaline slurry containing water and at least one compound selected from the group consisting of sodium silicate and potassium silicate, then coating said pattern with refractory material, applying to the thus coated pattern a liquid gelling agent for said slurry, said gelling agent being substantially free of water and comprising an inorganic acidic desiccative phosphorus compound and an organic carrier for said phosphorus compound, and then substantially immediately repeating said steps to build up a plurality of layers of refractory material.

2. The method as defined in claim 1 wherein said phosphorus compound is phosphorus pentoxide.

3. The method as defined in claim 2 wherein said refractory powder is applied to said pattern from a fluidized bed.

4. The method as defined in claim 2 wherein said pattern is a core box and said silicate refractory material and liquid gelling agent is sequentially poured in and out of said core box.

5. The method as defined in claim 2 wherein said organic carrier is an alcohol.

6. The process as defined in claim 6 wherein said alcohol is ethyl alcohol.

7. The method as defined in claim 2 wherein said gelling agent includes hydrolyzed alkyl silicate.

8. The method as defined in claim 2 wherein said pattern is initially coated with a slurry comprising hydrolyzed alkyl silicate.

9. The method as defined in claim 2 wherein said pattern is removed from the thus-formed layers of refractory material by heating said pattern to a temperature sufficient to melt said pattern, said temperature being less than 1,900° F.

10. A method of manufacturing multilayer shell molds which comprises the steps of applying to a pattern an alkaline slurry containing water and at least one compound selected from the group consisting of sodium silicate and potassium silicate, then coating said pattern with refractory material, applying to the thus coated pattern a liquid gelling agent for said slurry, said gelling agent being substantially free of water and comprising phosphorus trichloride and an organic carrier, and then substantially immediately repeating said steps to build up a plurality of layers of refractory material.

11. The method as defined in claim 10 wherein said refractory material is applied to said pattern from a fluidized bed.

12. The method as defined in claim 10 wherein said pattern is a core box and said silicate refractory material and liquid gelling agent is sequentially poured in and out of said core box.

13. The method as defined in claim 10 wherein said organic carrier is an alcohol.

14. The method as defined in claim 13 wherein said alcohol is ethyl alcohol.

15. The method as defined in claim 10 wherein said gelling agent includes hydrolyzed alkyl silicate.

16. The method as defined in claim 10 wherein said pattern is initially coated with a slurry comprising hydrolyzed alkyl silicate.

17. The method as defined in claim 10 wherein said pattern is removed from the thus formed layers of refractory material by heating said pattern to a temperature sufficient to melt said pattern, said temperature being less than 1,900° F.

UNITED STATES PATENT OFFICE
CERTIFICATE OF CORRECTION

Patent No. 3,616,840          Dated November 2, 1971

Inventor(s) Adam Dunlop

It is certified that error appears in the above-identified patent and that said Letters Patent are hereby corrected as shown below:

Column 6, line 13, after "in", for "claim 6" read -- claim 5 --.

Signed and sealed this 6th day of August 1974.

(SEAL)
Attest:

McCOY M. GIBSON, JR.           C. MARSHALL DANN
Attesting Officer          Commissioner of Patents